United States Patent [19]
Walker et al.

[11] Patent Number: 5,095,428
[45] Date of Patent: Mar. 10, 1992

[54] CACHE FLUSH REQUEST CIRCUIT FLUSHES THE CACHE IF INPUT/OUTPUT SPACE WRITE OPERATION AND CIRCUIT BOARD RESPONSE ARE OCCURRING CONCURRENTLY

[75] Inventors: Karl N. Walker, Hockley; Paul R. Culley, Cypress, both of Tex.

[73] Assignee: Compaq Computer Corporation, Houston, Tex.

[21] Appl. No.: 293,221

[22] Filed: Jan. 4, 1989

[51] Int. Cl.[5] .................... G06F 12/06; G06F 13/00
[52] U.S. Cl. ................... 395/425; 364/238.3; 364/239.7; 364/240; 364/262; 364/268.1; 364/243.41; 364/926.92; 364/933; 364/966.6; 364/935.4; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,562,535 | 12/1985 | Vincent et al. | 364/200 |
| 4,654,819 | 3/1987 | Stiffler et al. | 364/200 |
| 4,775,955 | 10/1988 | Liu | 364/900 |
| 4,833,601 | 5/1989 | Barlow et al. | 364/200 |
| 4,868,783 | 9/1989 | Anderson et al. | 364/900 |
| 4,926,317 | 5/1990 | Wallach et al. | 364/200 |
| 5,003,459 | 3/1991 | Ramanujan et al. | 364/200 |

OTHER PUBLICATIONS

G. Laws, "Multiprocessing on the Nubus Using Cache Inhibited Pages," *Microprocessors & Microsystems*, vol. 12, No. 3, pp. 147–152. (Apr. 1988).
W. Van Loo, "Maximize Performance by Choosing Best Memory," *Computer Design*, vol. 26, No. 14, pp. 89–94 (Aug. 1987).
IBM Personal System/2 Model 80 Technical Reference Manual, 1987, pp. 2-8 to 2-14 and 2-29 to 2-51.
Intel Corporation, Microprocessor and Peripheral Handbook, vol. 1, 1988, pp. 4–287 to 4–348.

*Primary Examiner*—Thomas C. Lee
*Assistant Examiner*—Mehmet Geckil
*Attorney, Agent, or Firm*—Pravel, Gambrell, Hewitt, Kimball & Krieger

[57] ABSTRACT

A computer system which flushes the cache controller when a circuit board is being configured or is responding to an input/output write operation. The flush operation can be disabled for each circuit board location. A cache flush operation can also be directly requested.

5 Claims, 3 Drawing Sheets

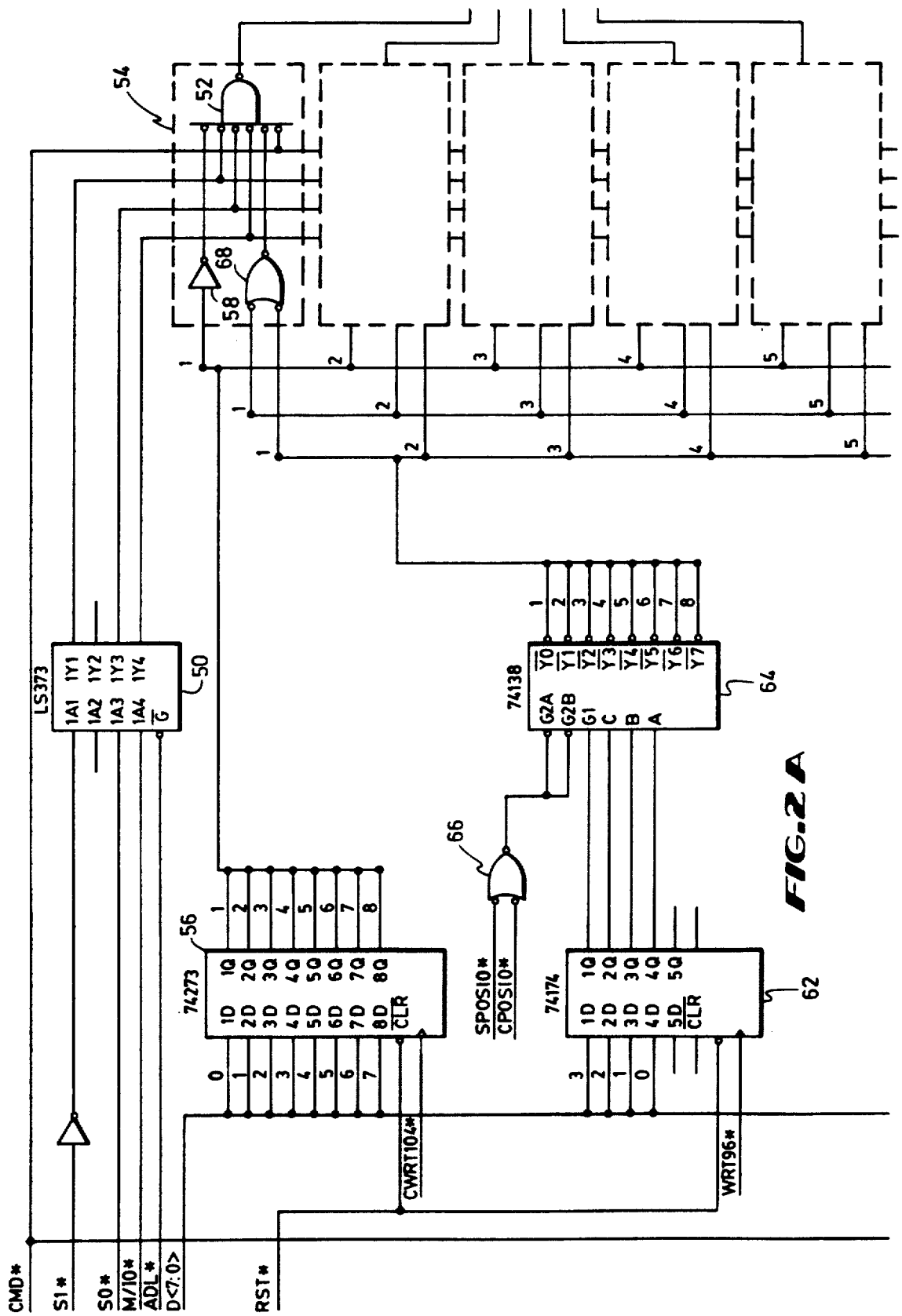

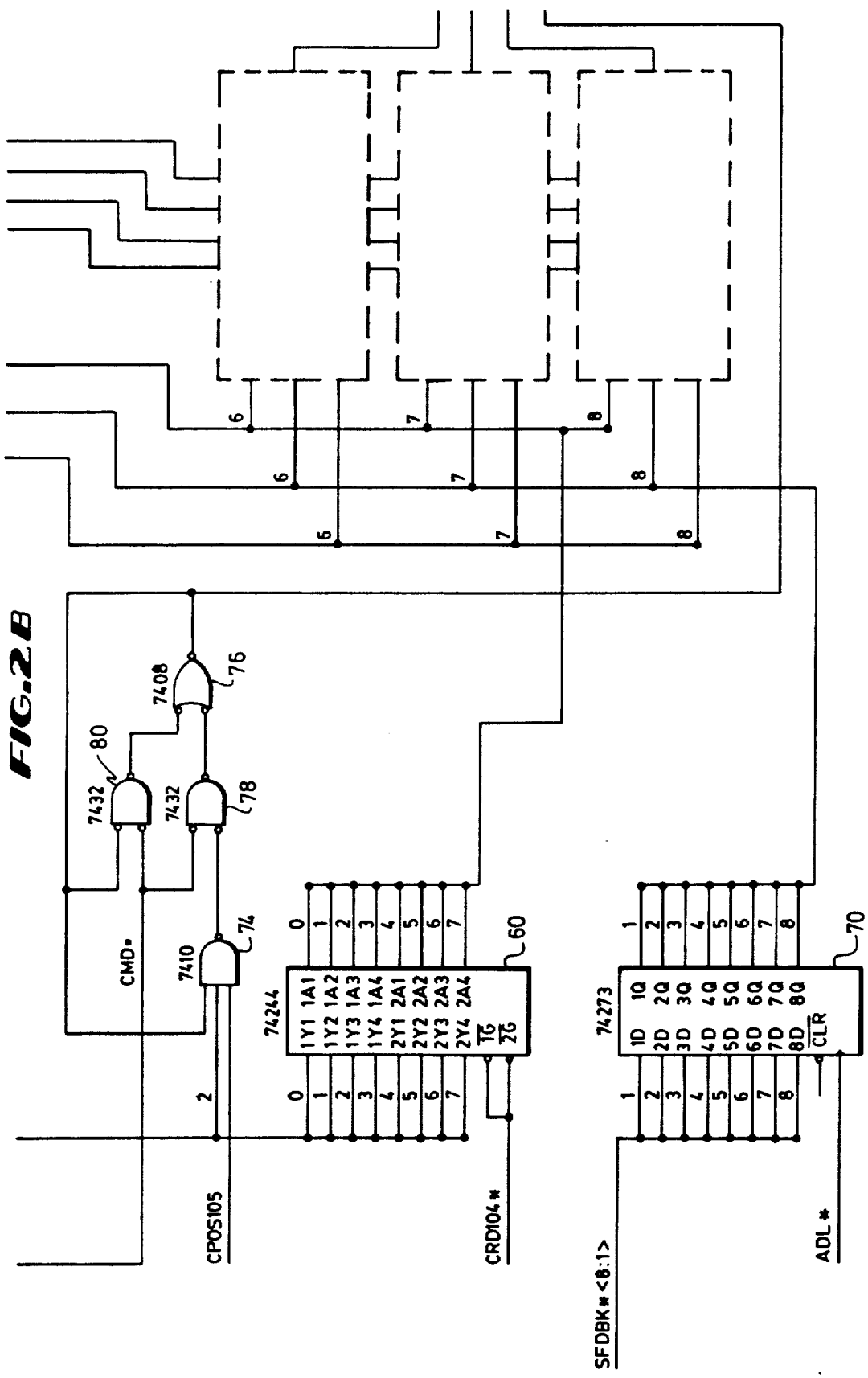

CACHE FLUSH REQUEST CIRCUIT FLUSHES THE CACHE IF INPUT/OUTPUT SPACE WRITE OPERATION AND CIRCUIT BOARD RESPONSE ARE OCCURRING CONCURRENTLY

BACKGROUND OF THE INVENTION

1. Field of the Invention

The invention relates to memory control systems used in computer systems, and more particularly to systems utilizing cache memory and paged main memory.

2. Description of the Prior Art

Personal computer systems are becoming increasingly prevalent and increasingly more powerful. Early personal computer systems, while a great advance over manual systems, were relatively simple and had limited capabilities. Personal computers took a step forward in capabilities when International Business Machines Corporation (IBM) introduced the original IBM PC. That computer was based on the 8088 microprocessor developed by Intel Corporation. The IBM PC was more powerful than earlier personal computers and new functions and capabilities for the IBM PC were rapidly developed. The components available for use in personal computers advanced significantly over this period and soon the design of the IBM PC was too limited, especially after the introduction by Intel Corporation of the 80286 microprocessor.

Personal computer users were demanding the available improvements and IBM introduced the IBM PC/AT, which utilized the 80286 microprocessor and many of the advanced devices which had been developed since the IBM PC was introduced. This machine satisfied users for a period of time, but again the capabilities of available components for use in personal computers increased and the demand for increased performance persisted.

The operating system utilized in IBM compatible computers was developed for use with the IBM PC and its incorporated 8088 microprocessor. The 8088 has 20 address pins and so only 1 Mbyte of memory is directly addressable. This was satisfactory in the early stages, but the availability of the 80286 and its 24 address lines and the need for programs accessing more than the available 640 kbytes of random access memory under the operating system rendered the operating system a limitation on personal computer performance. Various formats were developed to resolve this operating system imitation. One such format was the LIM expanded memory specification (LIM EMS), which used a window available in the memory space accessible under the operating system to access mode memory. The location of the window over the physically available memory was controlled by information passed through the input/output space. Thus, significantly greater amounts of memory could be accessed without a revision of the operating system and with only the inclusion of window control programming in the application program utilizing the additional memory.

To abate the user demand, Intel Corp. introduced the 80386 microprocessor. The increased speed of this unit helped to temporarily resolve the performance demand problem, but soon users still demanded more performance. One technique used in advanced or large computer architectures to increase performance was the use of cache memory. Cache memory is very fast memory which allows the microprocessor to operate at its full potential when operating out of this fast memory, unlike when operating out of main memory, where cost considerations limit the speed of the memory utilized. However, because of the relatively high cost of this cache memory, only portions of the information in the main memory are kept in the cache memory. This use of only portions requires that the cache memory system keep track of which portions of the main memory are duplicated in the cache memory.

This requirement to keep track of which portions of the main memory are located in the cache memory, called coherency, is difficult when utilizing memories which implement the LIM EMS or other paged memory techniques, wherein different physical memory locations can be addressed at the same logical address. For example, if the LIM EMS window is pointing to a first physical memory location and the cache memory saves the data at this location, the cache memory system thinks it has stored the data at a given location in the logical address space of the window. The window is then moved to a different physical portion of the memory, but the window logical address does not change. Thus the information present at the location preserved by the cache memory system is not what is currently present at that location. This creates a cache coherency problem and the specific location in the cache memory must be cleared or nullified.

One device commonly utilized in present personal computer systems to control the cache memory is the Intel Corporation 82385 cache controller. The 82385 does not allow individual cache memory locations to be cleared under certain circumstances, such as those described above. To this end, a cache flush operation must be performed which clears all entries in the cache memory system. In the past, to avoid the difficulties of determining when a cache flush was necessary, the designs have required that the applications programs or drivers used with LIM or paged memory systems insure that coherency problems did not develop. This was a burden on the programs and reduced their performance.

With the user demand for higher performance noted, a number of sources considered the architecture of the AT insufficient to properly utilize the full capabilities of then available components and of components which would clearly be available in the relatively near future. Certain operations, such as multiple bus master operations, were exceedingly difficult to perform and only marginal performance improvements could be obtained. To this end a new architecture or interface standard was developed.

IBM introduced a new line of personal computers, called the Personal System/2 or PS/2. A number of the machines available in the PS/2 family utilized the new interface standard, referred to as the Micro channel Architecture or MCA, to allow the advanced, desired capabilities to be provided at a high performance level. In addition to the conventional address, data and control signals necessary for operation, the MCA provides a card selected feedback signal or CD_SFDBK*(n), where the (n) indicates that a separate signal exists for each circuit board location. This signal provides feedback to the computer system to indicate which circuit board has responded to the operation presented on the system signal bus. For detailed information on the MCA, please refer to the IBM Personal System/2 Model 80 Technical Reference Manual, having a copyright date of 1987 and a product number of 84X1508.

One of the features provided by the MCA was the ability to initialize circuit board parameters entirely by program control, without the need to set any jumpers or switches. This feature was called Programmable Option Select (POS) and utilized certain defined input/output (I/O) space locations or ports to control which circuit boards or adaptors were being configured and where configuration information was to be located. A circuit board was configured by first selecting which circuit board location was to be addressed and placing the circuit board in setup or configuration mode. The configuration information was then loaded and setup mode exited.

Configuration information which could be transferred depended on the function of the particular circuit board being configured. For example, if a memory board was being configured, the information would include the memory space address locations to which the memory board would respond.

This programmable configuration capability is desirable, but also creates a potential cache coherency problem, similar to those discussed previously. The cache memory system could remember a given logical address and the computer system could reconfigure its resources, with another element ending up at the given logical address. Additionally, reconfiguration is a high level function which indicates major changes could be occurring in the computer system, with many possible cache coherency ramifications.

SUMMARY OF THE INVENTION

A computer system utilizing the MCA standard and an 82385 cache controller and incorporating the present invention determines when circuit boards are being configured or when an installed circuit board responds to an input/output space write operation and then issues a cache flush request. The request can be disabled on a circuit board location by circuit board location basis.

The system monitors write operations to the Adapter Enable/Setup register defined in the MCA and decodes which circuit board is being configured. The decoded signal is combined with a signal from a register which contains information on which circuit board locations have the cache flush option enabled. These signals are also combined with system signals which indicate that an input/output space write operation is occurring.

A second portion of the system monitors the card selected feedback signals and combines these signals with the location enabled signals and the input/output space write operation signals.

If either operation is occurring and that location is enabled, a cache flush signal is transmitted to the cache flush input on the 82385 cache controller.

The system also provides circuitry for directly requesting a cache flush to occur by sensing when a particular bit in a particular input/output space or port is written, to allow additional flexibility in design and implementation of the various programs that can be operated on the computer system.

BRIEF DESCRIPTION OF THE FIGURES

A better understanding of the invention can be obtained when the following detailed description of the preferred embodiment is considered in conjunction with the following drawings, in which:

FIGS. 2A, 2B and 2C are schematic diagrams of electrical circuitry for requesting a cache flush operation according to the present invention.

DETAILED DESCRIPTION OF THE PREFERRED EMBODIMENT

Figure 1:
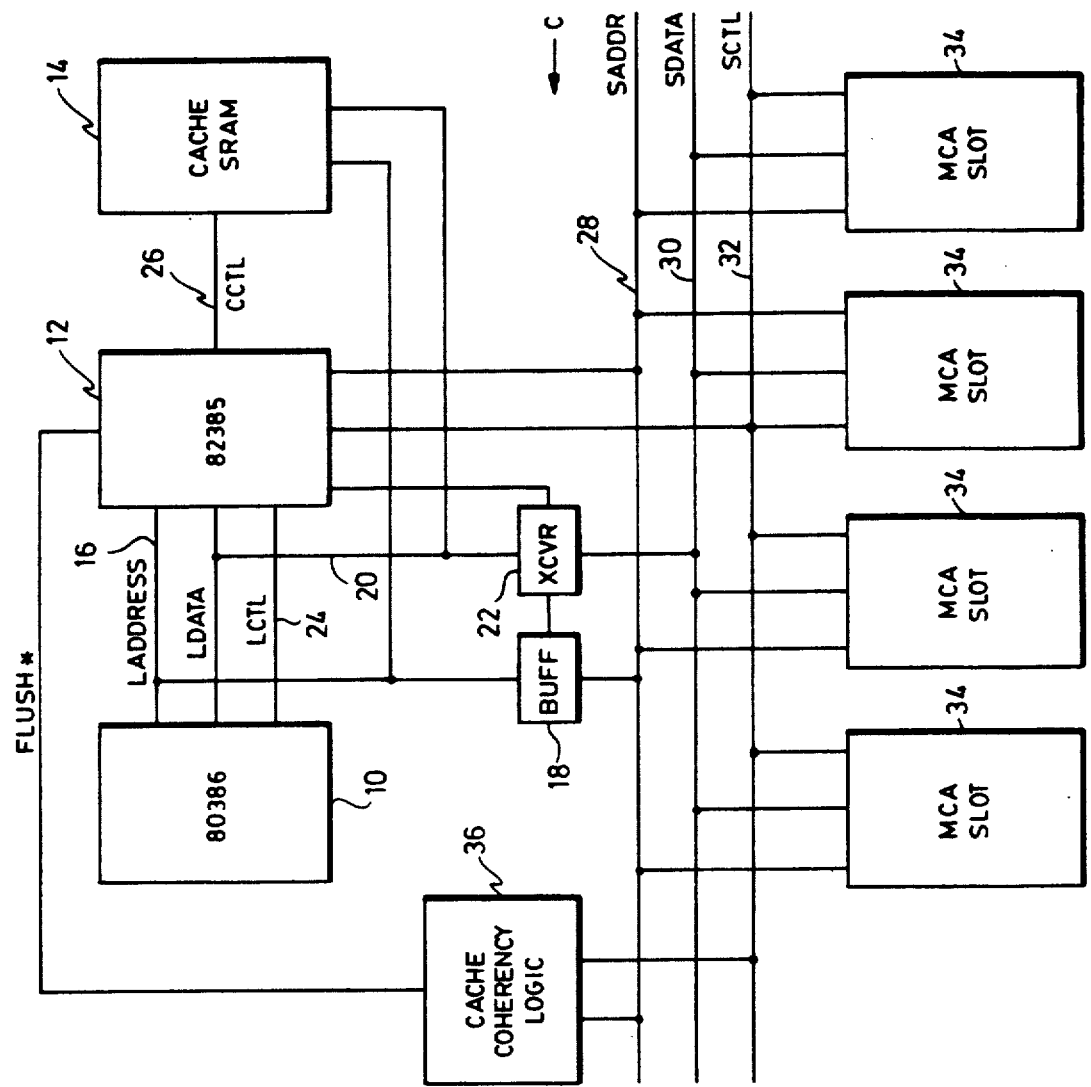
FIG. 1 is a block diagram of a computer system incorporating the present invention.

Referring now to FIG. 1, the letter C generally refers to a computer system incorporating the present invention. The computer includes an Intel Corporation 80386 microprocessor 10, an Intel Corporation 82385 cache controller 12 and a series of static random access memories (SRAM's) forming a cache memory unit 14. A local address bus 16 is connected between the 80386 10, the 82385 12, the cache RAM 14 and a buffer 18. A local data bus 20 is connected to the 80386 10, the 82385 12 and the cache RAM 14 as well as a transceiver 22. A local control bus 24 is connected between the 80386 10 and the 82385 12. A cache control bus 26 connects the 82385 12 and the cache SRAM 14 to provide proper control of the cache SRAM 14 as appropriate.

The buffer 18 and transceiver 22 are used to interface the local busses to the system busses which form portions of the Micro Channel Architecture. This local bus arrangement allows the microprocessor to operate at faster speeds and to allow concurrent operations during certain intervals and operations. The buffer 18 is connected between the local address bus 16 and the system address bus 28. The transceiver 22 is connected between the local data bus 20 and the system data bus 30. The system control bus is connected to the 82385 12 and is driven by the 82385 12, as explained in more detail in publications relating to the operation and description of the 82385, such as pages 4-287 to 4-348 of the October 1987 Volume 1 of the Microprocessor and Peripheral Handbook published by Intel Corporation.

The various MCA slots or locations are shown as MCA slots 34 and are connected to the system address bus 28, the system data bus 30 and the system control bus 32. This allows the various slots 34 to receive and transmit the necessary information to allow proper operation of any circuit boards included in the slots. Additionally, connected to the system address bus 28 and the system control bus 32 is the cache coherency logic 36, which contains the circuitry of the present invention utilized in determining the state of the FLUSH* signal provided to the flush input of the 82385 12. The cache coherency logic 36 is more fully disclosed in FIGS. 2, 2A, 2B and 2C.

As previously mentioned, cache coherency problems can result when a circuit board is being reconfigured or when the paging or memory location of the LIM EMS window, for example, are changed. In the computer according to the present invention, this occurs only during input/output (I/O) write operations. Therefore, it is necessary to determine when valid I/O operations are occurring. In the MCA, this condition is established or indicated by the S1* signal being high, the S0* signal being low and the M-IO* signal being low. To this end, the S0* signal, the M-IO* signal and the inverted S1* signal are provided to the inputs of a status latch 50. The gating signal for this status latch 50 is the ADL* signal which is used for address and status value latching. The use of the status latch 50 allows the I/O write information to be retained for the proper intervals. The outputs from the status latch 50 are connected to three of the six inputs of an OR gate 52 in a channel activity module 54.

Eight identical modules 54 are utilized in the preferred embodiment, with only one module 54 shown in FIG. 2A in detail for reasons of clarity. Additionally connected to one input of the OR gate 52 is the CMD* signal, which is used by the MCA to indicate that state of the data present on the system data bus 30. Therefore, the combination of the latched S1* inverted signal, the latched S0* signal and the latched M-IO* signal, in addition to the CMD* signal provide an indication, when all the signals are low, that an I/O write operation is occurring and the data is valid.

It is also necessary to determine which slot or card locations have been activated to allow cache flushing based upon these I/O write operations. This information is stored in a slot enabled latch 56. The inputs to the slot enabled latch 56 are connected to the D<7:0> signals of the data lines which are contained in the system data bus 30. The slot enabled latch 56 is gated by a signal referred to as CWRT104*. This is a signal which indicates that the I/O operation is a write operation occurring to address 104 and that the system of the preferred embodiment is in a special mode which allows access to this latch 56. In the MCA, the I/O port locations 100–107 have given and defined functions. In some cases the amount of storage space available at these locations may be determined to be insufficient, and therefore an alternate method has been determined to access additional information and register storing capability and yet remain within these allowed port locations. Each output line of the slot enabled latch 56 is connected to a channel activity module 54. The specific signal or output line is connected to an inverter 58, whose output is then connected to one input of the OR gate 52. Thus, if a given bit or location in the slot enabled latch 56 is set to a high condition, that particular slot or location is enabled for flush operation request, while if it is set to a low condition, the inverted value of a one or high level appearing at the OR gate 52 is such that a high signal always appears on the output of OR gate 52, thus disabling operation of that particular location's cache flush request capability.

A slot enabled buffer 60 (FIG. 2B) has its input connected to the outputs of the latch 56 and its output connected to the D<7:0> lines to provide the feedback to the computer system so that the value contained in the slot enabled latch 56 can be read. The gating signal which enables the output of the slot enabled buffer 60 is a signal referred to as CRD104*, which is the complement to the CWRT104* signal, so that when a read request is issued to I/O port 104 and the machine is operating in the special mode, the values of the slot enabled latch 56 are read.

It is now necessary to determine whether a given slot or location is in configuration mode or whether a card in that slot has responded to the current operation. Because of the specified characteristics of the MCA, even though board configuration is done by writing to the I/O space, the SFDBK* signal which is normally utilized to indicate that a board is responding to current operation, is not utilized during configuration mode and therefore separate circuitry must be utilized to determine this case. I/O port 96 is defined as the port for accessing the channel or board position select register (not shown). The three least significant bits of the position select register are utilized to indicate which of the various circuit boards is to be configured, with the next more significant bit indicating that board configuration is in operation. These four bits are provided to a configuration latch 62, with the gating signal to the configuration latch 62 being a signal referred to as WRT96*, which indicates that a write operation is occurring to I/O port address 96.

The three least significant bits, bits 0, 1 and 2 of the D<7:0> signals, are latched and provided to the three selection inputs of a 3-8 decoder 64. The fourth bit, referred to as bit 3, is provided to the positive enable bit of the decoder 64. The decoder 64 also has two low true enable inputs. These inputs are connected to the output of an AND gate 66 whose two inputs are the SPOSIO* and CPOSIO* signals. These signals indicate a standard IBM compatible mode POS I/O operation is occurring or a special mode POS I/O operation is occurring, respectively, when the signal is low. The outputs of the 3-8 decoder 64 are low true outputs of a line referring to the binary value selected at the three selection inputs. The 8 output lines of the decoder 64 are connected to the channel activity modules 54, one line to each module 54. The output line of the decoder 64 is connected to one input of an AND gate 68. The output of the AND gate 68 is the final input to OR gate 52. Thus, if a given board location is enabled for configuration, the appropriate output of the decoder 64 is low, so that a low value is provided to the input of the OR gate 52. If that particular board location is not being configured, a high value will be provided to the input of the AND gate 68 and, if the other input to the AND gate 68 is high, then a high value is applied to the OR gate 52 and that specific board location would not trigger a cache flush operation.

The second input to the AND gate 68 contained in each of the channel activity modules 54 is provided by the output of a feedback latch 70, whose inputs are connected to the 8 CD_SFDBK* signals. These signals, as specified in the MCA, are used to indicate that a given circuit board in that given slot or location has responded to the current operation, in this case an I/O write operation. Thus it is not necessary to provide address decoding capabilities which understand which I/O locations are being used by circuit boards. It is merely necessary to monitor the CD_SFDBK* lines and to determine if boards are being configured to determine if a cache flush operation is necessary. The gating signal to the feedback latch 70 is provided by the ADL* signal and corresponds to the timing indicated in the MCA specifications. Therefore, the inputs to the AND gate 68 are generally in a high state unless that particular board is responding to an operation or is being configured, and therefore the OR gate 52 is generally producing a high output. The output of the OR gate 52 is low only during the CMD* portion of an I/O write operation, when the particular channel is enabled and configuration mode is entered or an operation response is occurring.

Figure 2C:
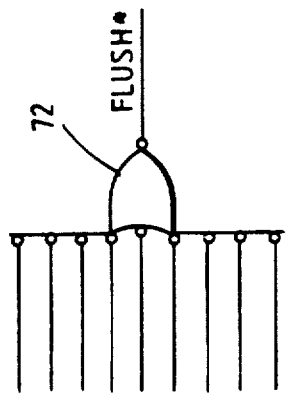
Figure 2:
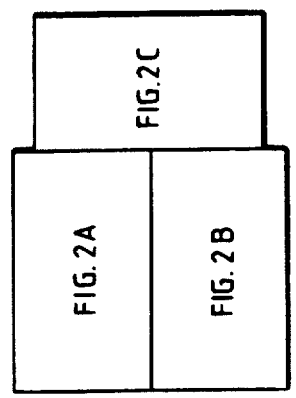
FIG. 2 is a diagram indicating the relative relationships between FIGS. 2A, 2B and 2C.

The outputs of the 8 channel activity modules 54 are 8 inputs to a 9 input flush AND gate 72 (FIG. 2C). The output of this flush AND gate 72 is the FLUSH* signal. The ninth input to the flush AND gate 72 is connected to circuitry which allows a cache flush operation to be requested directly by the microprocessor. A selected bit, in this case bit 2 of the data line, is present as one input to a three input NAND gate 74. The second input to this three input NAND gate 74 is a signal referred to as CPOS105, which indicates that an I/O operation is occurring to port 105 during system board configuration in the special mode. This combination is used to trigger the actuation of the cache flush. The third input to the NAND gate 74 is the output of an AND gate 76, which AND gate output is also the input to the flush AND gate 72. The output of the NAND gate 74 is provided as one input of an OR gate 78, with the second input of the OR gate 78 being the CMD* signal. In this manner, the state of the NAND gate 74 is only passed through the OR gate 78 during the active portion of the CMD* signal. The output of the OR gate 78 is connected to one input of the AND gate 76. The CMD* signal is also connected to one input of a second OR gate 80, whose second input is connected to the output of the AND gate 76. The output of the OR gate 80 is the second input to the AND gate 76. This feedback path from the AND gate 76 to the OR gate 80 and the NAND gate 74 is used so that the output pulse from the AND 76 is only the length of the CMD* signal and no greater. When the signal from the AND gate 76 goes low, this terminates the active state of the output signal from the NAND gate 74, causing it to go high. However, this signal from the NAND gate 74 has also been propagated through the OR gate 80 as a low signal, so that the input to the AND gate 76 from OR gate 80 is still low and thus the feedback situation continues until the CMD* signal goes high, at which time, after the propagation delays of the various gates, the output signal of the AND gate 76 goes high, ending the cache flush request.

The FLUSH* signal is held low for a time sufficient to allow the 82385 12 to fully flush or clear the tag valid bits. The FLUSH* signal is low for a sufficient time when developed as indicated because the length of the CMD* signal during an I/O write operation is sufficient to insure that the 82385 12 has received at least eight CLK2 cycles. Thus, no extra circuitry is necessary. However, such circuitry could be added between the flush AND gate 72 and the 82385 12 if necessary to insure the minimum time.

Therefore, the circuits described above cause a cache flush operation to occur whenever a slot or location is in configuration mode or a circuit board is responding to the current bus operation, that particular location is enabled and an I/O write operation is occurring. This insures cache coherency should the circuit board be a memory board or other board and the memory space location are changed.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

What is claimed is:

1. A cache flush request circuit for use in a computer system having a memory address space and an input/output address space, the computer system including cache memory which stores data held in the memory address space, a cache memory controller coupled to the cache memory having a cache flush request input, a system signal bus having address, data and control signals, a plurality of circuit board receiving locations connected to the system signal bus for insertion of circuit boards, which circuit boards are addressed over the system signal bus and which have a register that has data provided by signals presented on the system signal bus representing an input/output space operation or which are initialized by signals presented on the system signal bus, the cache flush request circuit comprising:

means connected to said system signal bus for determining when an input/output space write operation is occurring;
   means connected to said system signal bus for determining if an installed circuit board is responding to an operation requested over said system signal bus; and
   means responsive to said input/output space write operation determining means and to said installed circuit board responding determining means for determining if said input/output space write operation and said circuit board response are occurring concurrently and producing a cache flush request signal which is connected to the cache flush request input of the cache memory controller if said input/output space write operation and said circuit board response are occurring concurrently.

2. The circuit of claim 1, further comprising:
   means connected to said system signal bus for determining if a circuit board initialization operation is occurring;
   and wherein said input/output space write operation and circuit board response concurrent operation determining means is further responsive to said circuit board initialization operation determining means for determining if said input/output space write operation and said circuit board initialization operation are occurring concurrently and producing a cache flush request signal which is connected to the cache flush request input of the cache memory controller if said input/output space write operation and said circuit board initialization operation are occurring concurrently.

3. A cache flush request circuit for use in a computer system having a memory address space and an input/output address space, the computer system including cache memory which stores data held in the memory address space, a cache memory controller coupled to the cache memory having a cache flush request input, a system signal bus having address, data and control signals, a plurality of circuit board receiving locations connected to the system signal bus for insertion of circuit boards, which circuit boards are addressed over the system signal bus and which have a register that has data provided by signals presented on the system signal bus representing an input/output space operation or which are initialized by signals presented on the system signal bus, the cache flush request circuit comprising:

means connected to said system signal bus for determining when an input/output space write operation is occurring;
   means connected to said system signal bus for determining if a circuit board initialization operation is occurring; and
   means responsive to said input/output space write operation determining means and to said circuit board initialization operation determining means for determining if said input/output space write operation and said circuit board initialization operation are occurring concurrently and producing a cache flush request signal which is connected to the cache flush request input of the cache memory controller if said input/output space write operation and said circuit board initialization operation are occurring concurrently.

4. The circuits of claims 1, 2 or 3, further comprising:
   means for selectively disabling production of said cache flush request signal for a given circuit board location.

5. The circuits of claims 1, 2 or 3, further comprising:
   means for directly requesting production of said cache flush request signal.

* * * * *